United States Patent
Schilling

[11] Patent Number: 5,503,532
[45] Date of Patent: Apr. 2, 1996

[54] DIFFUSION BONDED AIRFOIL AND METHOD

[75] Inventor: Jan C. Schilling, Middletown, Ohio

[73] Assignee: General Electric Company, Cincinnati, Ohio

[21] Appl. No.: 340,090

[22] Filed: Nov. 14, 1994

[51] Int. Cl.⁶ .................. F01D 5/18; B23D 15/04
[52] U.S. Cl. .................. 416/233; 29/418; 29/889.72; 228/193; 228/235.1
[58] Field of Search .................. 416/223 A, 232, 416/233; 29/889.71, 889.72, 889.721, 418; 228/193, 235.1, 118

[56] References Cited

U.S. PATENT DOCUMENTS

| | | | |
|---|---|---|---|
| 2,807,437 | 9/1957 | Roush | 416/233 |
| 3,383,093 | 5/1968 | Howald | 416/233 |
| 3,628,226 | 12/1971 | Nelson . | |
| 3,656,222 | 4/1972 | Jones . | |
| 4,089,456 | 5/1978 | Toppen et al. . | |
| 4,417,381 | 11/1983 | Higginbotham . | |
| 4,815,939 | 3/1989 | Doble . | |
| 5,063,662 | 11/1991 | Porter et al. . | |
| 5,072,871 | 12/1991 | Moracz et al. . | |
| 5,083,371 | 1/1992 | Leibfried et al. . | |
| 5,176,499 | 1/1993 | Damlis et al. . | |
| 5,269,058 | 12/1993 | Wiggs et al. | 416/233 |
| 5,285,573 | 2/1994 | LeMonds et al. . | |
| 5,344,063 | 9/1994 | Johnston et al. . | |

FOREIGN PATENT DOCUMENTS 313602  12/1989  Japan .................. 29/889.721

Primary Examiner—Edward K. Look
Assistant Examiner—James A. Larson
Attorney, Agent, or Firm—Andrew C. Hess; Patrick R. Scanlon

[57] ABSTRACT

An airfoil includes preformed first and second sides joinable together at a bond line extending between first and second opposite edges thereof. The first side includes a first extension having a proximal end forming a first end of the bond line, an intermediate section, and a distal end. The second side includes a second extension extending from the airfoil first edge which is fixedly joinable to the distal end of the first extension. The intermediate section of the first extension is spaced from the airfoil first edge to define therewith a working void so that pressure loading on the intermediate section is carried in part through the bond line first end for diffusion bonding thereof.

10 Claims, 2 Drawing Sheets

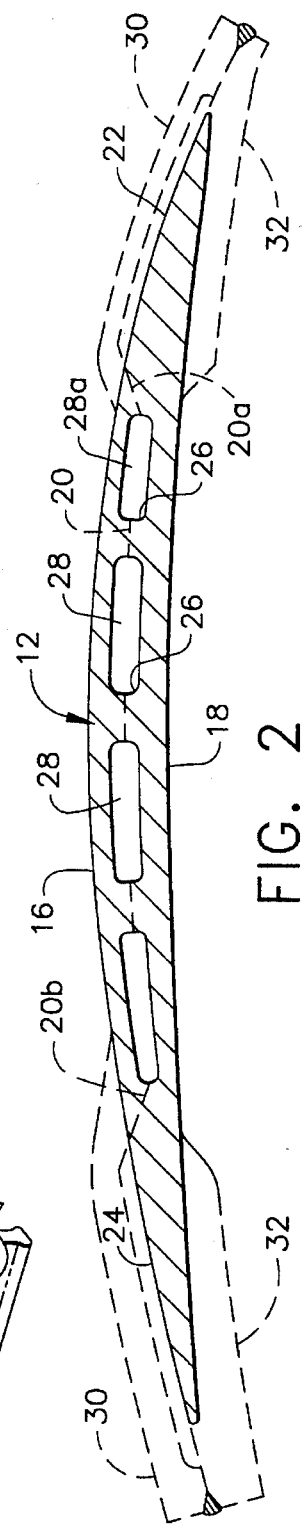
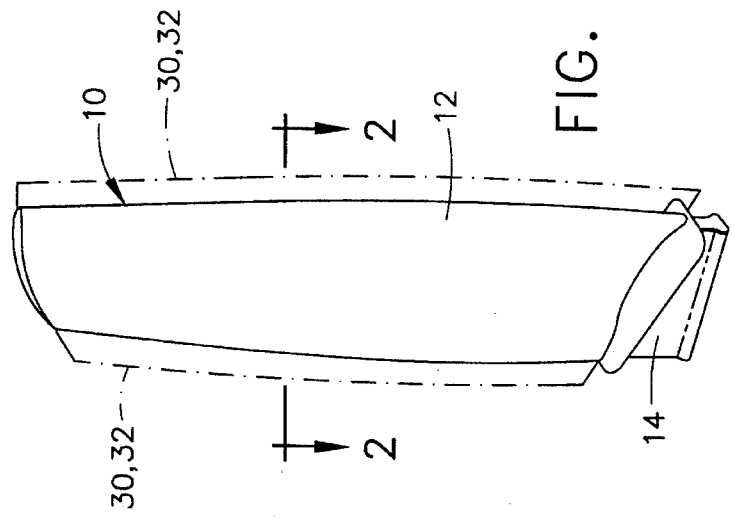

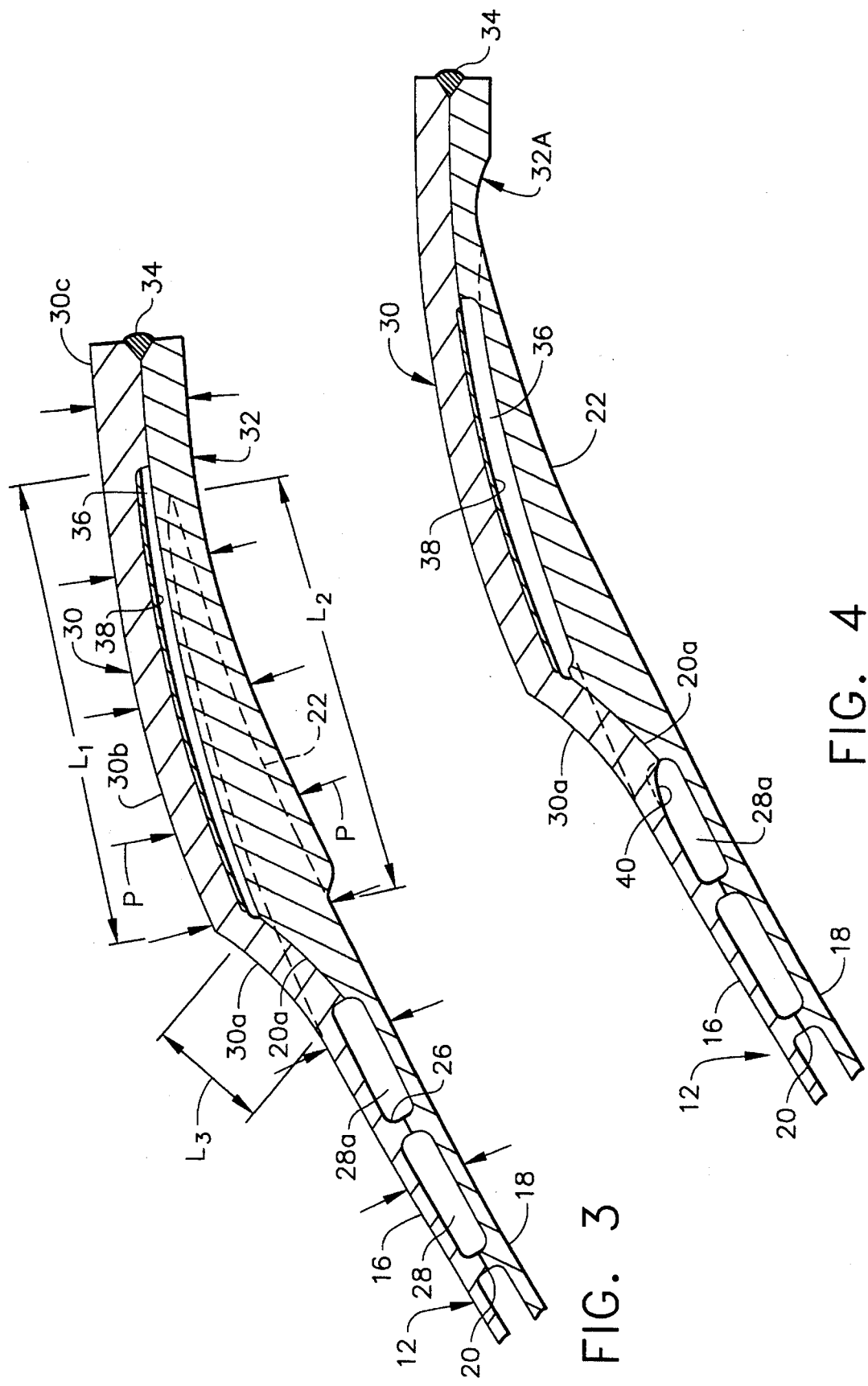

DIFFUSION BONDED AIRFOIL AND METHOD

The present invention relates generally to diffusion bonding, and, more specifically, to diffusion bonding of large airfoils for gas turbine engines.

BACKGROUND OF THE INVENTION

Large aircraft turbofan gas turbine engines have correspondingly large fan blades which may be about 1.5 meters long for example. In order to reduce the weight of the fan blades, they are typically formed as hollow, thin skinned members having internal stiffening ribs which typically define several radially extending passages therein.

Diffusion bonding is one conventional technique for forming the airfoils of the fan blades. In diffusion bonding, first and second airfoil preformed sections or halves are disposed together in abutting contact along a bond line or surface, with the leading and trailing edges of the airfoil being temporarily welded together so that the airfoil becomes pressure tight. The airfoil is then subjected to predetermined pressure-temperature-time conditions so that the airfoil sections may be metallurgically joined together at the bond line. Diffusion bonding does not rely on melting of the parent material as is required in conventional welding processes, but instead, the parent material undergoes plastic yielding and creeping at the elevated temperatures and pressures involved for forming an improved bond along the bond line.

In most cases, the equipment used to form diffusion bonds is custom built for the specific parts being bonded, with the bonding usually occurring in a vacuum or in a suitable inert gas. Diffusion bonding may occur at various elevated temperatures and pressures with varying degrees of plastic deformation of the components. For example, the skin of the airfoil may actually collapse around the internal ribs during the diffusion process and must be returned to a suitable configuration typically accomplished by internally pressurizing the airfoil to inflate the skin to its original form.

Diffusion bonding may occur at various pressures ranging from 1 to about 1,000 atmospheres, but it is desirable to conduct diffusion bonding at relatively low pressures of about 1 to 6 atmospheres. However, it is extremely difficult to diffusion bond at moderate pressures gas turbine engine fan blades formed of titanium with large surface areas. This is particularly true for leading and trailing edges of blade airfoils which are relatively rigid and spaced relatively far from the adjacent internal passages formed in the airfoil by the radially extending ribs therein. The diffusion bond line typically extends substantially equidistantly between the two airfoil halves from the leading edge to the trailing edge and can have a relatively large camber length from each of the leading and trailing edges to the next adjacent internal passage. It is difficult to provide pressure loading along the leading and trailing edges for ensuring a suitable amount of mating force along the bond line thereat for obtaining effective diffusion bonding thereof.

Furthermore, the mating surfaces of the airfoil halves along the leading and trailing edges, and specifically adjacent to the internal passage, may have irregularities therein which prevent the desired intimate contact therebetween. Such irregularities may result in incomplete bonding during the diffusion process, which may lead to rejection of the airfoil.

In one conventional arrangement, an airfoil has a bonding line extending generally along the camber centerline thereof between the leading and trailing edges, and the leading and trailing edges each includes respective extensions thereof having a mating bond line therebetween. The extensions are welded along the edge of the bond line for making the airfoil pressure tight so that external pressure may be applied for diffusion bonding together the airfoil halves. The extensions are then conventionally machined away revealing the final, finish contour of the leading and trailing edges. However, the extensions merely form extensions of the bond line along the airfoil camber line and therefore increase the difficulty of achieving a suitable diffusion bond.

SUMMARY OF THE INVENTION

An airfoil includes preformed first and second sides joinable together at a bond line extending between first and second opposite edges thereof. The first side includes a first extension having a proximal end forming a first end of the bond line, an intermediate section, and a distal end. The second side includes a second extension extending from the airfoil first edge which is fixedly joinable to the distal end of the first extension. The intermediate section of the first extension is spaced from the airfoil first edge to define therewith a working void so that pressure loading on the intermediate section is carried in part through the bond line first end for diffusion bonding thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is a perspective view of an exemplary gas turbine engine fan blade formed by diffusion bonding in accordance with one embodiment of the present invention.

FIG. 2 is a radial sectional view through the airfoil of the blade illustrated in FIG. 1 and taken along line 2—2.

FIG. 3 is a radial sectional view through the leading edge portion of the airfoil section illustrated in FIG. 2 and includes first and second extensions for use in diffusion bonding.

FIG. 4 is a radial sectional view of the leading edge portion of the airfoil illustrated in FIG. 2 showing first and second extensions for diffusion bonding in accordance with another embodiment of the present invention.

DESCRIPTION OF THE PREFERRED EMBODIMENT(S)

Illustrated in FIG. 1 is an exemplary fan blade 10 for a turbofan aircraft gas turbine engine which includes an airfoil 12 formed in accordance with one embodiment of the present invention, and a conventional integral dovetail 14. The fan blade 10 may be relatively large, and for example is about 1.5 meters long. The airfoil 12 is preferably formed of titanium in this exemplary embodiment and is formed by diffusion bonding in accordance with the present invention.

FIG. 2 illustrates in solid line the final, finished aerodynamic profile of the airfoil 12 at an exemplary radial section, with FIG. 3 illustrating a leading edge portion of the airfoil 12 prior to diffusion bonding thereof. As shown in FIGS. 2 and 3, the airfoil 12 includes a preformed first side or section 16 which is generally convex for forming the suction surface of the airfoil 12. The airfoil 12 also includes a complementary preformed second side or section 18 which is generally concave and forms the pressure side of the airfoil 12. The two halves or sides 16, 18 are joinable together at a bond line or surface 20 which extends generally between first and second opposite edges or end sections 22, 24, which in the embodiment illustrated in the Figures define the leading and trailing edges, respectively, of the airfoil 12 which are relative to the incoming air which flows over the airfoil 12 during operation. The bond line 20 also extends through a plurality of internal ribs 26 which define chordally therebetween a plurality of radially or longitudinally extending internal cavities or passages 28. In the exemplary embodiment illustrated in FIG. 3, the bond line 20 bifurcates the ribs 26 in generally equal halves.

As shown in FIG. 2, and in more particularity in FIG. 3, the first and second edges 22, 24 are relatively long along the airfoil chord between the adjacent passages 28 and the end-most portion thereof. In one conventional diffusion bonding process for joining together airfoil halves, the bond line would extend along the center camber line of the airfoil bifurcating the leading and trailing edges thereof. However, the bond line in these regions is relatively long and increases the difficulty of obtaining suitable bonding loads thereat and complete bonding thereof.

In accordance with one embodiment of the present invention as illustrated in FIG. 3, the airfoil first side 16 includes a first integral extension 30 disposed at the first edge 22 which extension 30 has a proximal end 30a forming a first end 20a of the bond line 20. The first extension 30 also includes an intermediate section 30b and a distal end or section 30c. The airfoil second side 18 correspondingly includes a second extension 32 which extends generally coextensively from the airfoil first edge 22 and is fixedly joined to the distal end 30c of the first extension 30 by a conventional weld 34. FIG. 3 illustrates one radial section of the airfoil 12, with the first and second extensions 30, 32 extending for the entire radial or longitudinal length of the airfoil 12. The weld 34 similarly extends the entire length of the airfoil and provides a seal to ensure that the airfoil 12 is pressure tight for undergoing diffusion bonding.

As shown in FIG. 3, the intermediate section 30b of the first extension 30 is preferably spaced laterally from the airfoil first edge 22 to define therewith a working void 36, with the first extension 30 being supported solely at its two opposite ends, i.e. the proximal end 30a and the distal end 30c, with the intermediate section 30b being unsupported over the void 36. During diffusion bonding of the first and second sides 16, 18, the outer surfaces thereof, including the first and second extensions 30, 32, may be conventionally pressurized, preferably using a relatively low pressure force designated P of up to about 6 atmospheres. Pressurizing together the first and second sides 16, 18 is conventionally accomplished at a suitable elevated temperature and for predetermined time for diffusion bonding together the first and second sides 16, 18 along the bond line 20. After diffusion bonding of the airfoil halves 16, 18, the two extensions 30, 32 are removed as required by conventional machining for forming the airfoil first edge 22 to its final, aerodynamic shape.

In the preferred embodiment illustrated in FIG. 3, the internal passages 28 include an end-most passage 28a disposed directly adjacent to the airfoil first edge 22, and the bond line first end 20a extends through the first side 16 from the end-most passage 28a to the working void 36. The first extension 30 preferably extends substantially parallel to the airfoil first edge 22, and the working void 36 is chordally elongate between the proximal and distal ends 30a, 30c of the first extension 30. The bond line first end 20a preferably extends chordally obliquely from the end-most passage 28a, with both the first extension intermediate section 30b and the working void 36 extending completely over the airfoil first edge 22 along the chord or camber lines of the airfoil 12.

As shown in FIG. 3, the working void 36 has a first chordal length $L_1$, and the finished airfoil first edge 22 has a second chordal length $L_2$, with the first length $L_1$ being preferably greater than the second length $L_2$ for maximizing the pressure forces acting over the intermediate section 30b. The bond line first end 20a has a length $L_3$ which is substantially less than the void length $L_1$. In this way, the pressure loading P over the intermediate section 30b is carried in part through the proximal end 30a, and through the bond line first end 20a to the mating portion of the airfoil first edge 22 for diffusing bonding thereof. Generally half of the pressure loading force P applied over the unsupported intermediate section 30b adds to the pressure forces acting over the proximal end 30a to increase the total bonding force along the bond line first end 20a for improving diffusing bonding thereat. The remaining half of the pressure load is carried by the distal end 30c. Since the bond line first end 20a extends obliquely from the end-most passage 28a and not along the camber centerline through the airfoil first edge 22, it has a shorter length than it otherwise would and further improves the effectiveness of diffusing bonding thereof.

In the exemplary embodiment illustrated in FIG. 3, the second extension 32 fully encases the airfoil first edge 22, shown in phantom line, along the entire extent of the working void 36, and after diffusing bonding of the airfoil sides 16, 18, the excess material of the second extension 32 is conventionally machined away for revealing the finished airfoil leading edge 22. The proximal end 30a of the first extension 30 is also conventionally machined away adjacent to the first end 20a of the bond line 20 for removing the first extension 30 and leaving the finished surface contour of the airfoil first side 16.

If the specific diffusion bonding process results in plastic collapsing of the intermediate section 30b of the first extension 30 into the void 36 and contact with the second extension 32, a layer of a conventional stop-off material 38 may be provided on the inner surface of the intermediate section 30b in the working void 36 for preventing diffusing bonding between the intermediate section 30b and the second extension 32 containing the airfoil first edge 22. Any suitable stop-off material 38 may be used such as Boron Nitride which is typically used to line the internal passages 28 to prevent diffusing bonding upon collapse of the opposing airfoil first and second sides 16, 18 during the diffusing bonding process.

Illustrated in FIG. 4 is an alternate embodiment of the second extension designated 32A which extends solely from an end of the airfoil first edge 22 and does not fully encase the first edge 22 as in the embodiment illustrated in FIG. 3. In this embodiment, the first edge 22 is preformed or finished to its final aerodynamic contour except for the small region thereof from which the second extension 32A extends. The second extension 32 illustrated in FIG. 3 which encases the airfoil first edge 22 adds additional strength for accommodating the pressure forces experienced during diffusion bonding. If the strength of the finished airfoil first edge 22 is alone sufficient for withstanding the pressure forces during the diffusion bonding process, then the additional material thereon is not required, and the relatively simple second extension 32A shown in FIG. 4 may be used instead. FIG. 4 also illustrates that additional parent material 40 may be added to the airfoil first side 16 at the corner of the end-most passage 28a adjacent to the first end 20a of the bond line 20 for ensuring a suitable minimum thickness of the airfoil first side 16 at that location after machining away of the proximal end 30a of the first extension 30.

Although the invention has been described above with respect to the leading edge 22 of the airfoil 12, it may also be similarly applied to the trailing edge 24 as well, and is shown in phantom in FIG. 2. Corresponding configurations of the first and second extensions 30, 32 may be similarly used at the airfoil trailing edge 24 for providing an effective diffusion bond at a second end 20b of the bond line 20 at the trailing edge 24.

The improved preformed airfoil sides 16, 18 having the first and second extensions 30, 32 provide minimum bond area at the critical leading and trailing edges 22, 24 of the airfoil 12. The diffusion bonding pressure at the respective ends 20a, b of the bond line 20 are increased due to the reduction in the bond area as well as the amplification of bonding pressure provided by the unsupported intermediate section 30b of the first extension 30. It is anticipated that better control of stress concentrations at the end-most internal passage 28a may be obtained since any surface irregularities in the bond line first end 20a may be eliminated by plastic creep under the improved pressure loading thereat. Furthermore the airfoil 12 is provided with near-finished airfoil surfaces in its preformed configuration for diffusion bonding, with minimum excess material at the leading and trailing edges 22, 24 being provided which must be removed by machining after the diffusion bonding process. And, the improved configuration of the airfoil 12 disclosed above may be used wherever beneficial in various conventional forms of diffusion bonding whether at low or high pressures as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An incipient airfoil comprising:

a preformed first side and a complementary preformed second side joinable together at a bond line extending between first and second opposite edges and through a plurality of internal ribs defining therebetween a plurality of internal passages;

said airfoil first side-including at said first edge a first extension having a proximal end forming a first end of said bond line, an intermediate section, and a distal end;

said airfoil second side including at said first edge a second extension being fixedly joinable to said distal end of said first extension; and wherein said intermediate section of said first extension is spaced from said airfoil first edge to define therewith a working void so that pressure loading on said intermediate section is carried in part to said bond line first end for diffusion bonding thereof.

2. An airfoil according to claim 1 wherein said internal passages include an end-most passage disposed directly adjacent to said airfoil first edge, and said bond line first end extends through said airfoil first side from said end-most passage to said working void.

3. An airfoil according to claim 2 wherein said first extension extends substantially parallel to said airfoil first edge, and said working void is elongate between said proximal and distal ends of said first extension.

4. An airfoil according to claim 3 wherein said bond line first end extends chordally obliquely from said end-most passage, and said working void extends completely over said airfail first edge.

5. An airfoil according to claim 4 wherein said working void has a length, and said bond line first end 20a has a length less than said void length.

6. An airfoil according to claim 5 wherein said intermediate section of said first extension includes a layer of a stop-off material on an inner surface thereof in said working void opposite said airfoil first edge for preventing diffusion bonding therebetween.

7. An airfoil according to claim 5 wherein said second extension fully encases said airfoil first edge along said working void.

8. An airfoil according to claim 5 wherein said second extension extends solely from an end of said airfoil first edge.

9. An airfoil according to claim 5 wherein:

said airfoil first edge is a leading edge for first receiving a working fluid during operation of said airfoil;

said airfoil first side is a generally convex, suction side; and said airfoil second side is a generally concave, pressure side.

10. A method of diffusion bonding together along a bond line complementary airfoil preformed first and second sides collectively defining an airfoil having opposite leading and trailing edges, pressure and suction sides, and internal passages therein, comprising:

providing a first extension on said airfoil first side at one of said leading and trailing edges, and a second extension on said airfoil second side at said airfoil one edge, said first extension having a proximal end forming an end of said bond line, an intermediate section spaced from said airfoil one edge to define therewith a working void, and a distal end fixedly joined to said second extension 32;

pressurizing together said airfoil first and second sides, including said first and second extensions, at elevated temperature and for a predetermined time for diffusing bonding together said first and second sides along said bond line; and removing by machining said first and second extensions for forming to final aerodynamic shape said airfoil one edge.

* * * * *